US012754537B2

(12) United States Patent
Descoqs et al.

(10) Patent No.: US 12,754,537 B2
(45) Date of Patent: Oct. 6, 2026

(54) METHOD AND DEVICE FOR CHECKING THE COMPLIANCE OF A WORKPIECE

(71) Applicants: SAFRAN AIRCRAFT ENGINES, Paris (FR); SAFRAN, Paris (FR)

(72) Inventors: Augustin Marie Michel Descoqs, Moissy-Cramayel (FR); Julien Alexis Louis Ricordeau, Moissy-Cramayel (FR); Quentin Sulli, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 1210 days.

(21) Appl. No.: 17/754,585

(22) PCT Filed: Oct. 7, 2020

(86) PCT No.: PCT/FR2020/051767
§ 371 (c)(1),
(2) Date: Apr. 6, 2022

(87) PCT Pub. No.: WO2021/069837
PCT Pub. Date: Apr. 15, 2021

(65) Prior Publication Data

US 2024/0077857 A1 Mar. 7, 2024

(30) Foreign Application Priority Data

Oct. 7, 2019 (FR) ...................................... 1911075

(51) Int. Cl.
*G05B 19/418* (2006.01)
*G06Q 10/0639* (2023.01)

(52) U.S. Cl.
CPC . *G05B 19/41885* (2013.01); *G06Q 10/06395* (2013.01)

(58) Field of Classification Search
CPC ........ G06Q 10/06395; G05B 19/41885; G05B 13/042; G01B 21/042; H03M 7/4006
See application file for complete search history.

(56) References Cited

U.S. PATENT DOCUMENTS 5,099,440 A * 3/1992 Pennebaker ........ H03M 7/4006 702/181
5,526,293 A * 6/1996 Mozumder .......... G05B 13/042 700/121

(Continued)

FOREIGN PATENT DOCUMENTS

CN 108121295 A 6/2018
FR 3063153 A1 8/2018

OTHER PUBLICATIONS

French Search Report issued in French Application FR1911075 on Jun. 17, 2020 (2 pages).

(Continued)

*Primary Examiner* — Lam S Nguyen
(74) *Attorney, Agent, or Firm* — Bookoff McAndrews, PLLC

(57) ABSTRACT

Method for checking the compliance of a workpiece, comprising the following steps: estimating a risk of non-compliance of characteristic on the basis of a law of probability associated with the characteristic; and verifying whether the estimated risk of non-compliance satisfies a decision criterion and, if so, declaring that the workpiece is compliant for characteristic; if not, measuring a value of the characteristic, determining whether or not the workpiece is compliant based on the measured value, and updating the law of probability associated with characteristic based on the measured value.

11 Claims, 7 Drawing Sheets

(56) References Cited

U.S. PATENT DOCUMENTS

| | | | |
|---|---|---|---|
| 9,836,564 B1 | 12/2017 | Zhang et al. | |
| 2011/0282480 A1 | 11/2011 | Jang et al. | |
| 2015/0276558 A1 | 10/2015 | Cheng et al. | |
| 2017/0138726 A1* | 5/2017 | Roithmeier .......... | G01B 21/042 |
| 2018/0150038 A1 | 5/2018 | Lin et al. | |

OTHER PUBLICATIONS

International Search Report issued in International Application PCT/FR2020/051767 on Jan. 14, 2021 with English Translation (2 pages).

Office Action ssued in corresponding Chinese Application No. 2020800773041, issued Apr. 23, 2025.

* cited by examiner

[Fig. 1]
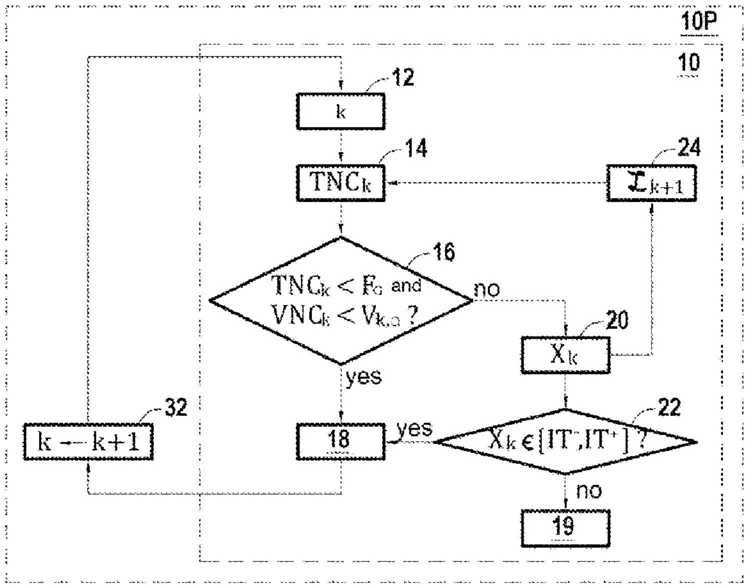
[Fig. 2]
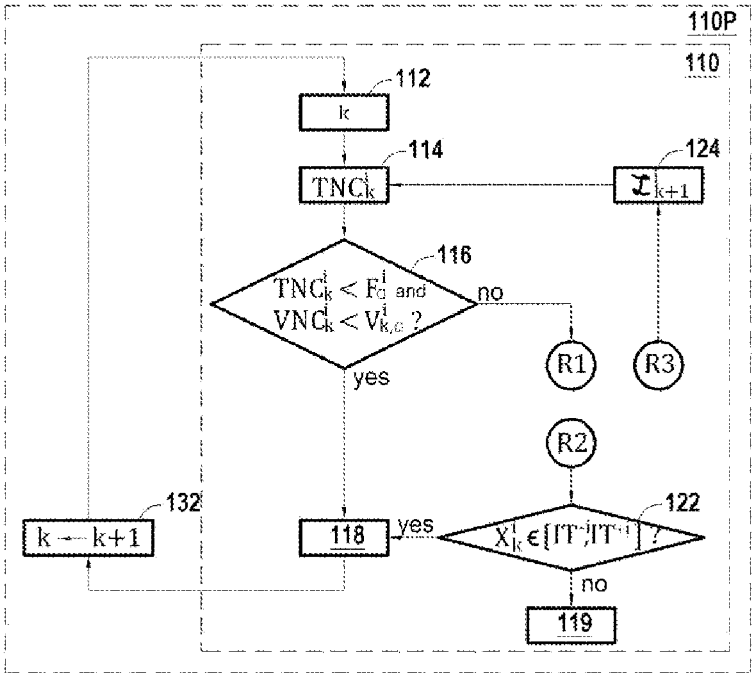

[Fig. 3]
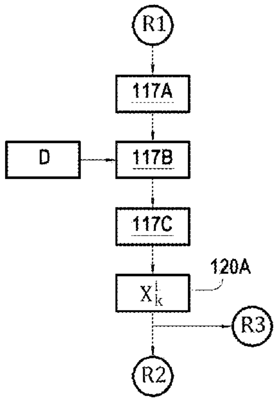

[Fig. 5A]
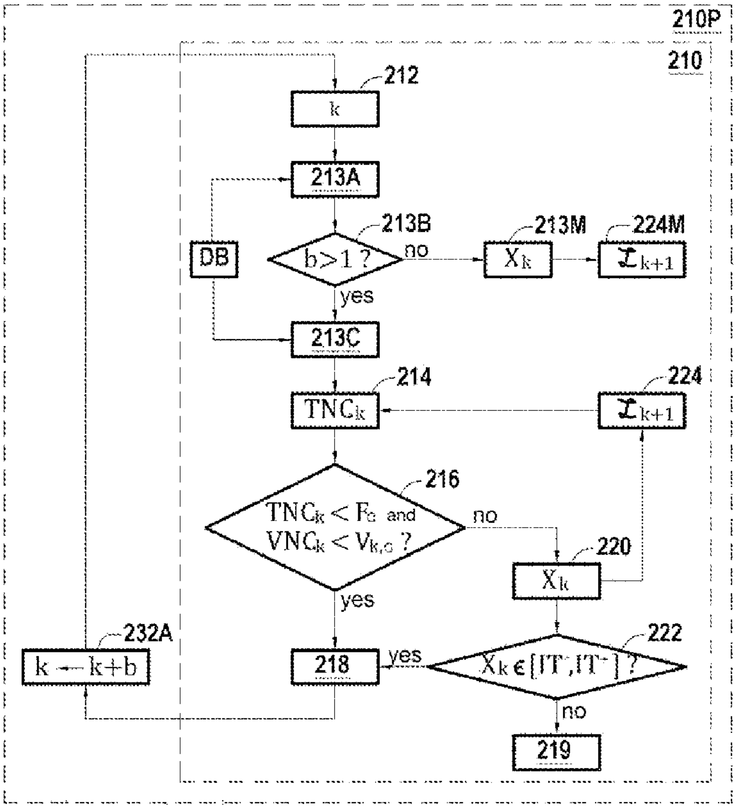
[Fig. 5B]
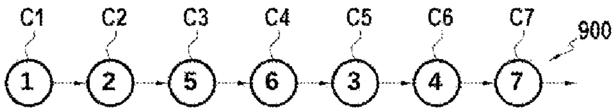

[Fig. 5C]
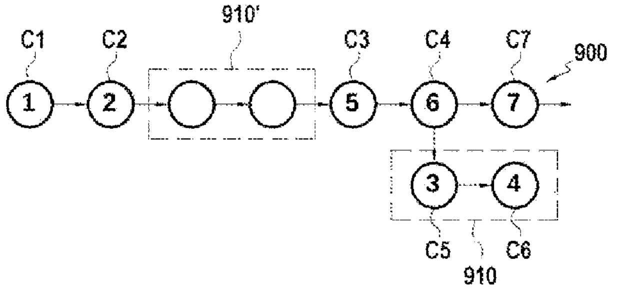
[Fig. 6A]
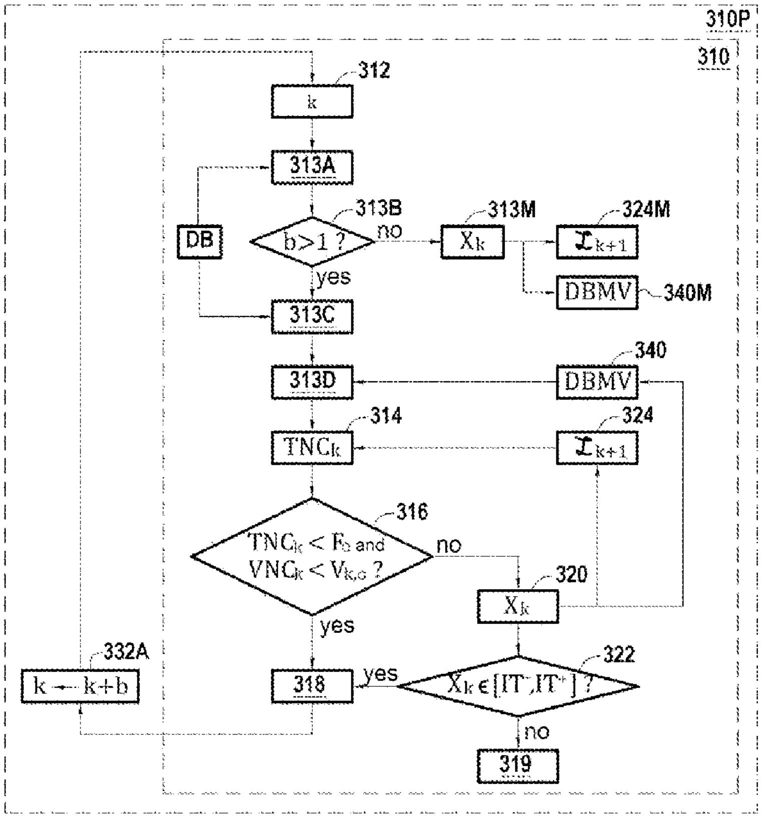

[Fig. 6B]
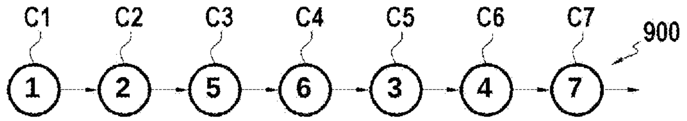
[Fig. 6C]
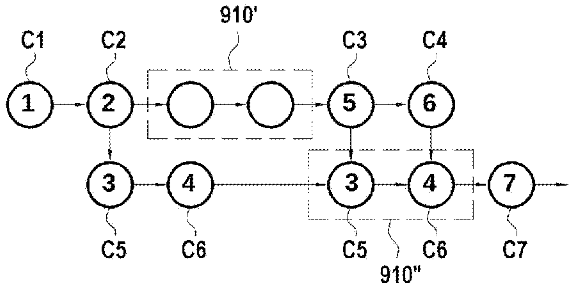
[Fig. 7]
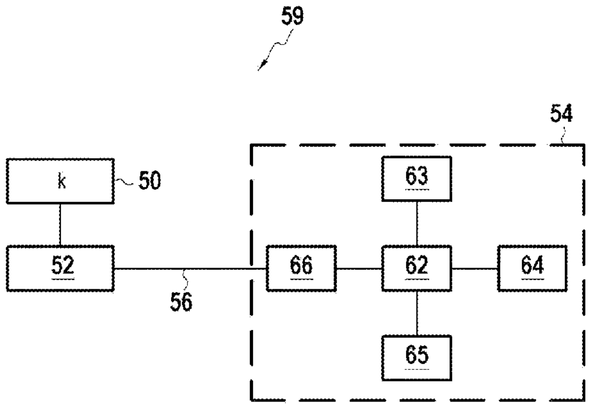

METHOD AND DEVICE FOR CHECKING THE COMPLIANCE OF A WORKPIECE

CROSS-REFERENCE TO RELATED APPLICATIONS

This patent application is a continuation of and claims the benefit of priority to International Patent Application No. PCT/FR2020/051767, filed on Oct. 7, 2020, which claims benefit to French Application 1911075, filed on Oct. 7, 2019, the entirety of which is incorporated herein by reference.

FIELD OF THE INVENTION

The present disclosure concerns a method for checking compliance of a workpiece, and more particularly a method allowing improved efficacy of quality control in an industrial environment.

TECHNOLOGICAL BACKGROUND

In a production process, a workpiece is defined by specifications which can relate to the dimensions, materials, internal stresses etc. thereof. These specifications generally include tolerances i.e. a maximum tolerated deviation from the nominal value of the specifications. As part of quality control, it is verified that the workpiece complies with its specifications i.e. the characteristics of the workpiece do not differ from their nominal value more than is allowed by tolerance.

Quality control can represent lengthy additional time in the production process. This time is particularly significant for parts produced in very large quantities.

To reduce this time and to gain in productivity, mostly statistical methods have been imagined for checking only a reduced sample of workpieces and to infer therefrom the compliance of a larger batch. These methods give satisfaction for workpieces for which reliability is only moderately critical.

On the other hand, for parts for which reliability is critical, these methods are not adapted since it is difficult and even impossible to demonstrate that there is a low risk of not detecting a non-conformity. There is therefore a need for a novel method of checking workpiece compliance, that is time-efficient and has a reduced risk of allowing non-compliance to go undetected.

A method of this type has already been proposed in document FR 3 063 153 A1.

SUMMARY OF THE INVENTION

The present disclosure sets out to meet this need at least in part.

This disclosure concerns a method for checking the compliance of a workpiece having at least one characteristic, the method comprising the following steps:

- estimating a risk of non-compliance of the characteristic on the basis of a law of probability associated with the characteristic; and
- verifying whether the estimated risk of non-compliance satisfies a decision criterion and, if so, declaring that the workpiece is compliant for the characteristic; if not, measuring a value of the characteristic, determining whether or not the workpiece is compliant based on the measured value, and updating the law of probability associated with the characteristic based on the measured value.

By using a law of probability that is updated on each actual measurement performed on the workpiece such as just described, the checking method is able to be self-adaptive with respect to any drift in production. In addition, this self-adaptation does not require any inventiveness by a human expert.

In some embodiments, the decision criterion comprises a first criterion whereby it is verified that the estimated risk of non-compliance is lower than a fixed threshold.

In some embodiments, the decision criterion comprises a second criterion whereby it is verified that a value, that is a function of the estimated risk of non-compliance and of the estimated risks of non-compliance of workpieces for which the decision criterion has previously been applied, is lower than a threshold which is a function of the number of said workpieces.

In some embodiments, said value is only a function of the estimated risk of non-compliance and of the estimated risks of non-compliance of workpieces for which the decision criterion has previously been satisfied.

In some embodiments, the law of probability is updated using a sequential Monte Carlo method.

In some embodiments, the workpiece has p characteristics, where p is an integer at least equal to 2, and the steps of estimation of a risk of non-compliance and verification of a decision criterion are performed for each of the p characteristics.

In some embodiments, when the decision criterion is not satisfied for at least one of the p characteristics:

- a list of said at least one characteristic is defined for which the decision criterion is not satisfied;
- a list of measuring operations is defined on the basis of said list of said at least one characteristic for which the decision criterion is not satisfied, together with a dependency tree associating each of the p characteristics with at least one measuring operation which can be performed on the workpiece;
- a list is also defined of additional characteristics of the workpiece, said list of additional characteristics comprising at least some of the characteristics able to be measured by performing the measuring operations in said list of measuring operations, on the basis of said list of measuring operations;
- a value is measured of each said at least one characteristic for which the decision criterion is not satisfied, and a value of each of the characteristics in said list of additional characteristics; and
- each of the laws of probability is updated associated with each of said at least one characteristic for which the decision criterion is not satisfied and each of the laws of probability associated with said additional characteristics is updated, on the basis of the values thus measured.

In this manner, the method makes maximum use of information able to be drawn from the measuring operations which at all events need to be carried out following the result of the step verifying the decision criterion, The present disclosure also concerns a method for monitoring the production of workpieces, comprising the following steps:

- providing a plurality of workpieces of same type; and
- checking the compliance of each of these workpieces with the checking method previously described.

In some embodiments, the compliance of each of said workpieces is checked in the order in which they are provided.

In other embodiments, the compliance of each said workpieces is checked in an order differing from the order in which they are provided.

In some embodiments, the compliance of each of said workpieces is checked in an order differing from the order in which they are provided, and a value of the at least one characteristic is measured for each of the workpieces being checked in contrary order to the order in which they are provided, independently of the estimated risk of non-compliance for each of said at least one characteristic.

In other embodiments, the compliance of each of said workpieces is checked in an order differing from the order in which they are provided, all the measured values are placed in memory and, before estimating the risk of non-compliance of a workpiece, the law of probability associated with each of said at least one characteristic of said workpiece is updated on the basis of the measured values placed in memory.

In this manner, estimation of the risk of non-compliance is based on a greater number of measurement data points and is therefore more reliable. The monitoring method is therefore even more robust against drifts in production.

In one particular embodiment, the different steps of the checking or monitoring method are determined by computer programme instructions.

The invention therefore also concerns a programme on a data medium, this programme able to be implemented in a checking device or more generally a computer, this programme comprising instructions adapted for implementation of the steps of a checking or monitoring method such as described above.

This programme can use any programming language, and can be in the form of a source code, object code or an intermediate code between source code and object code, for example in a partially compiled form or in any other desirable form.

The invention also concerns a data medium readable by a computer or microprocessor, and comprising programme instructions such as mentioned above.

The data medium can be any entity or device capable of storing the programme. For example, the medium can comprise storage means such as a ROM e.g. a CD-ROM or the ROM of a microelectronic circuit, or magnetic recording means e.g. a floppy disc or hard disc.

Also, the data medium can be a transmissible medium such as an electrical or optical signal able to be conveyed via electrical or optical cable, via wireless or other means. The programme of the invention can be downloaded in particular from a network of Internet type.

The present disclosure also concerns a device for checking the compliance of a workpiece having at least one characteristic, comprising a measuring machine configured to measure a value of said at least one characteristic, a command module, transmission means configured to transmit measured values from the measuring machine to the command module, and to transmit instructions from the command module to the measuring machine, the command module being configured to estimate a risk of non-compliance of the characteristic on the basis of a law of probability associated with the characteristic, to verify whether the estimated risk of non-compliance satisfies a decision criterion and, if so, to declare that the workpiece is compliant for the characteristic; if not, the command module being configured to instruct the measuring machine to measure a value of the characteristic to determine whether or not the workpiece is compliant on the basis of the value thus measured, and to update the law of probability associated with the characteristic on the basis of the value thus measured.

Said device can be used to implement the checking or monitoring method previously described. In addition, the device may comprise all or some of the characteristics previously detailed relating to the method.

BRIEF DESCRIPTION OF THE DRAWINGS

The invention and its advantages will be better understood on reading the following detailed description of embodiments of the invention given as nonlimiting examples. This description refers to the appended Figures in which:

FIG. 1 is a block diagram illustrating a checking method and monitoring method according to a first embodiment;

FIG. 2 is a block diagram illustrating a checking method and monitoring method according to a second embodiment;

FIG. 3 is a block diagram illustrating a sub-part of the block diagram in FIG. 2;

FIG. 5A is a block diagram illustrating a checking method and monitoring method according to a third embodiment;

FIGS. 5B and 5C are diagrams explaining in an example the functioning of the methods in FIG. 5A;

FIGS. 5B and 5C are diagrams explaining in an example the functioning of the methods in FIG. 5A;

FIG. 6A is a block diagram illustrating a checking method and monitoring method according to a fourth embodiment;

FIGS. 6B and 6C are diagrams explaining in an example the functioning of the methods in FIG. 6A;

FIGS. 6B and 6C are diagrams explaining in an example the functioning of the methods in FIG. 6A;

FIG. 7 schematically illustrates a checking device.

DETAILED DESCRIPTION OF THE INVENTION

Figure 4A:
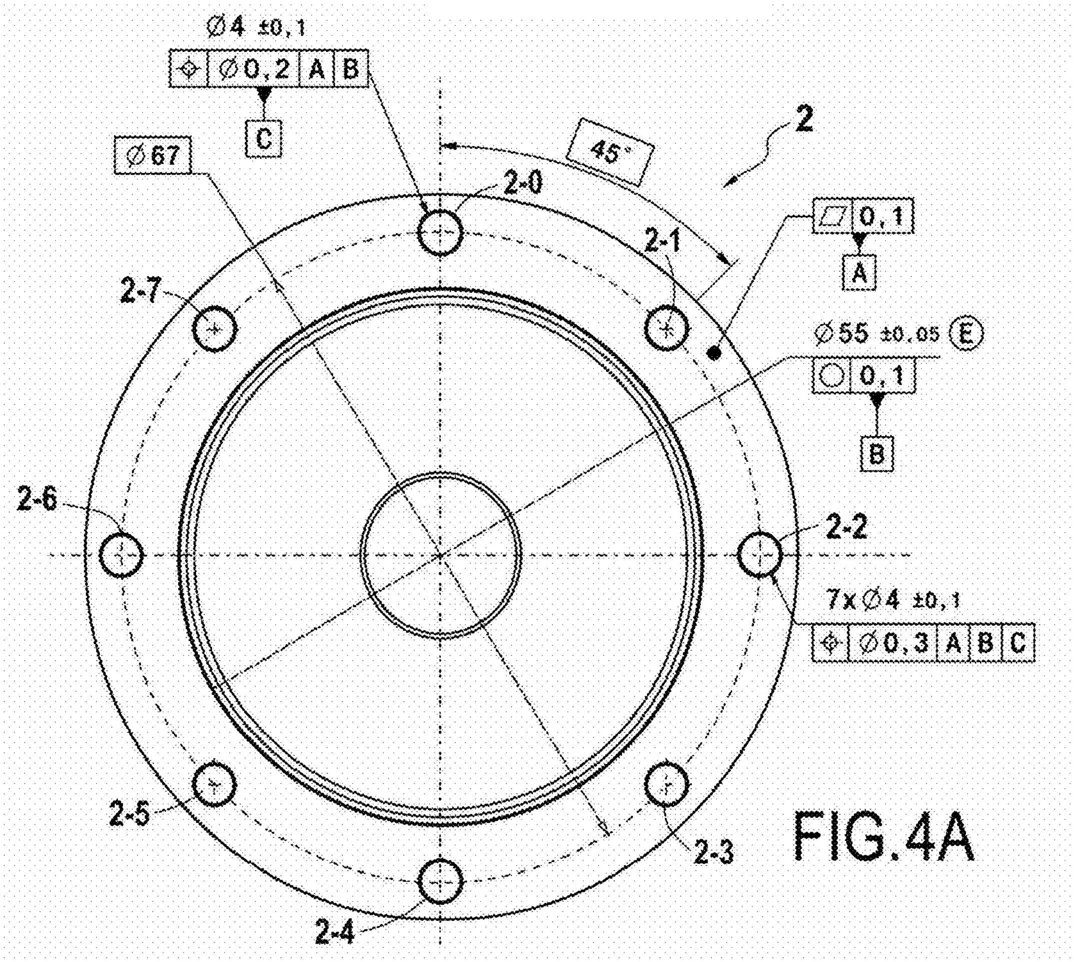
FIGS. 4A to 4D are diagrams explaining the steps of the block diagram in FIG. 3, in a practical example.

A method for checking the compliance of a workpiece according to a first embodiment will be described with reference to FIG. 1 which schematically illustrates the steps of said method.

The method for checking the compliance of a workpiece 10 comprises a step 12 to provide a workpiece k.

In the first embodiment, the workpiece k has a characteristic X the compliance of which it is desired to verify. In the remainder hereof, denotations having the letter k in subscript relate to the workpiece k of which the compliance is verified during the checking method 10.

In one example, characteristic X is a dimensional value measured on workpiece k.

The compliance of characteristic X is defined by a nominal value N, an upper tolerance $IT^+>N$, and lower tolerance $IT^-<N$. Therefore, a value of characteristic X is considered compliant if it lies within the interval $[IT^-, IT^+]$, where $N\in[IT^-, IT^+]$.

Workpiece k being provided, estimation step 14 follows at which a risk of non-compliance $TNC_k$ of workpiece k is estimated. This risk of non-compliance $TNC_k$ is estimated on the basis of a law of probability associated with characteristic X as is detailed below.

The checking method 10 next comprises a verification step 16 at which it is verified that the estimated risk of non-compliance $TNC_k$ obtained at estimation step 14 satisfies the decision criterion.

If the result of the verification step 16 is positive i.e. the estimated risk of non-compliance $TNC_k$ satisfies the decision criterion, the method moves onto step 18 at which the workpiece k is declared to be compliant for characteristic X. As is detailed below, the decision criterion is a function of an acceptable risk level a of non-compliance.

If, on the contrary, the result of the verification step 16 is negative i.e. the estimated risk of non-compliance $TNC_k$ does not satisfy the decision criterion, the method moves onto measuring step 20 at which the actual value $X_k$ of characteristic X is measured.

The fact that the decision criterion is satisfied at step 16 indicates that the estimated risk of non-compliance $TNC_k$ entails a real risk of non-compliance that is sufficiently low for acceptability having regard to risk level α. The fact that the decision criterion is not satisfied at step 16 indicates that the estimated risk of non-compliance $TNC_k$ entails a real risk of non-compliance that is not sufficiently low for acceptability having regard to risk level a. Examples of decision criteria are detailed below.

Once the actual value $X_k$ of characteristic X is measured, the method moves onto checking step 22 at which it is verified whether $X_k$ is compliant. If $X_k$ is compliant i.e. $X_k \in [IT^-, IT^+]$, the method moves onto step 18 at which workpiece k is declared compliant for characteristic X. On the contrary, if $X_k$ is non-compliant, the method moves onto step 19 at which workpiece k is declared non-compliant.

As previously mentioned, the estimated risk of non-compliance $TNC_k$ is estimated on the basis of a law of probability $\mathcal{L}_k$ associated with characteristic X, i.e. $TNC_k = \mathbb{P}(y_k \notin [IT^-, IT^+])$, where $y_k$ is assumed to follow the law of probability $\mathcal{L}_k$.

In addition, the law of probability $\mathcal{L}_k$ is updated on the basis of the actual value $X_k$ of characteristic X. More specifically, as illustrated in FIG. 1, if measuring step 20 has been performed, the checking method 10 also carries out the updating step 24 at which the law of probability $\mathcal{L}_k$ is updated to obtain an updated law of probability $\mathcal{L}_{k+1}$.

In this embodiment, the law of probability $\mathcal{L}_k$ is updated with a sequential Monte Carlo method also known under the names «particulate filter» or «particle filter». Said method is well known in the literature and is therefore not described in detail herein. It is simply recalled here that, with said method, a measurement distribution model $M(y|\theta)$ is determined, distribution possibly being of any suitable type (e.g. Gaussian distribution, Weibull distribution or bimodal distribution) of which the parameters θ are not exactly known. The parameters θ are therefore themselves described by an empirical distribution $P_k(\theta)$. When a new observation is available i.e. when an actual value $X_k$ is obtained, the empirical distribution $P_k(\theta)$ is reviewed as a function of the actual value $X_k$, and then drifts following Brownian motion. This gives a new empirical distribution $P_{k+1}(\theta)$. The calculations required for this operation are approximated with Monte Carlo simulation. Finally, knowing $P_{k+1}(\theta)$, the expected distribution $\mathcal{L}_{k+1}$ is obtained of measurement $X_{k+1}$ on workpiece k+1, by integrating the product $P_{k+1}(\theta) \times M(x|\theta)$ on all the possible values of parameters θ.

At all events, after the updating step 24, an updated law of probability $\mathcal{L}_{k+1}$ is obtained and stored in memory to be used to estimate the risk of non-compliance of workpiece k+1.

By using a law of probability updated at each actual measurement made on the workpiece in the manner just described, the checking method 10 is able to be self-adaptive against any drifts in production.

As an alternative to the sequential Monte Carlo method, it is possible to use a method of the type Weighted Moving Average (WMA) or AutoRegressive Integrated Moving Average (ARIMA). These methods are well known in the literature and are therefore not described in detail herein. Nevertheless, a sequential Monte Carlo method is preferable for the two following reasons. First, recourse to a Monte Carlo method allows the empirical distribution $P_{k+1}(\theta)$ to be found by approximation, even if it cannot be exactly found (which is the case as soon as the distribution having parameters θ that are not exactly known does not follow a Gaussian law). Secondly, since it is a sequential method, it is compatible with Bayesian estimation of risk of non-compliance $TNC_k$. Initially, estimation of the risk of non-compliance $TNC_k$ becomes increasingly more accurate through the taking into account of the first actual measurements performed on the first workpieces; this gain in accuracy is then offset by Brownian motion drift on each update, which leads to a near-stationary state of estimation of the risk of non-compliance $TNC_k$.

Details of an example will now be given of a decision criterion used at the decision step 16 to decide whether the workpiece k must effectively be checked i.e. to decide whether or not it is necessary to proceed with the measuring step 20.

The decision criterion comprises a first criterion whereby it is verified that the estimated risk of non-compliance $TNC_k$ is lower than a fixed threshold $F_\alpha$, i.e. verified that $TNC_k < F_\alpha$. By «fixed», it is meant here that the threshold is dependent on the acceptable risk level a of non-compliance, but is not dependent on the number of workpieces already checked i.e. is not dependent on k. The fixed threshold $F_\alpha$ can therefore be a multiple of α, i.e. $F_\alpha = m \times \alpha$ where m is a suitably chosen actual number. The first criterion can therefore be written $TNC_k < m \times \alpha$. For example, a value can be retained of m=10. The fixed threshold $F_\alpha$ therefore represents the maximum risk of non-compliance which is considered to be acceptable on a single workpiece.

By providing the first criterion, it is proceeded with effectively checking workpiece k as soon as the law of probability indicates a risk of non-compliance of workpiece k that is too high. This contributes towards making the checking method 10 robust against drifts in production.

The decision criterion also comprises a second criterion whereby it is verified that a value $VNC_k$ which is a function of the estimated risk of non-compliance $TNC_k$ and of the estimated risks of non-compliance of workpieces for which the decision criterion has previously been applied, is lower than a threshold $V_{k,\alpha}$, i.e. it is verified that $VNC_k < V_{k,\alpha}$. The threshold $V_{k,\alpha}$ is a function of the number of said workpieces. In other words, the threshold $V_{k,\alpha}$ depends not only on the acceptable risk level a of non-compliance but also on the number of workpieces already checked i.e. of k. The threshold $V_{k,\alpha}$ can therefore be a multiple of α and of k, i.e. $V_{k,\alpha} = m' \times k \times \alpha$ where m' is a suitably chosen actual number. For example, a value of m'=1 can be retained i.e. $V_{k,\alpha} = k \times \alpha$.

Value $VNC_k$ can be a weighted sum of these risks of non-compliance i.e.

$$VNC_k = \sum_{j=1}^{k} a_j TNC_j$$

where values $a_j$ are actual numbers. The second criterion can therefore be written $$\sum_{j=1}^{k} a_j TNC_j < m' \times k \times \alpha.$$

Preferably, value $VNC_k$ is only a function of the estimated risk of non-compliance $TNC_k$ and of the estimated risks of non-compliance of workpieces for which the decision criterion has previously been satisfied i.e. $a_j=0$ if characteristic X has been measured on workpiece j. In this manner, value $VNC_k$ represents the accumulated risk of non-compliance related to the fact that a certain number of workpieces were not effectively checked before workpiece k.

Additionally, in this case, value $VNC_k$ can give equal consideration for example to the risks of non-compliance of each of the workpieces for which the decision criterion has previously been satisfied i.e. $a_j=0$ if characteristic X has been measured on workpiece j, otherwise $a_j=1$. In this manner, the accumulated risk of non-compliance represented by value $VNC_k$ is related to the number of workpieces before workpiece k which have not been effectively checked. However, it is possible to weight value $VNC_k$ differently, for example by providing for lower values of $a_j$ as and when j decreases, even zero values for all values of j lower than a certain integer.

By providing the second criterion, effective checking is performed on workpiece k as soon as the accumulation of risks of non-compliance on workpiece k and the workpieces which have not been effectively checked exceeds a certain threshold. This contributes towards making the checking method 10 even more robust against drifts in production.

The checking method 10 just described can be included in a method 10P for monitoring the production of workpieces. This monitoring method comprises the providing of a plurality of workpieces k, k being between 1 and Q, and checking the compliance of each workpiece k with the previously described checking method 10. Iteration of the checking method 10 for each workpiece k is illustrated in FIG. 1, by the incrementation step 32.

The checking method 10 and/or monitoring method 10P can be implemented by a checking device 59 such as illustrated in FIG. 7. The checking device 59 here comprises a measuring machine 52 configured to measure a value of the characteristic of the workpiece 50, a command module 54 and transmission means 56 configured to transmit values measured by the measuring machine 52 to the command module 54 and to transmit instructions from the command module 54 to the measuring machine 52.

The command module 54 is configured to estimate a risk of non-compliance of the characteristic on the basis of a law of probability associated with the characteristic, to verify whether the estimated risk of non-compliance satisfies a decision criterion and, if so, to declare that the workpiece 50 is compliant for the characteristic; if not, the command module 54 is configured to instruct the measuring machine 52 to measure a value of the characteristic to determine whether or not the workpiece is compliant on the basis of the value thus measured, and to update the law of probability associated with the characteristic on the basis of the value thus measured.

The command module 54 here has the physical architecture of a computer such as schematically illustrated in FIG. 7. In particular, it comprises a processor 62, a read-only memory 63, a random-access memory 64, a non-volatile memory 65 and communication means 66 with the measuring machine 52 enabling the command module 59 to obtain measurements performed by the measuring machine 52 in response to instructions receive from the command module 59. The command module 59 and the measuring machine 52 are linked for example via a digital data bus or series interface (ex. USB interface (Universal Serial Bus)) or via wireless known per se.

The read-only memory 63 of the command module 59 forms a recording medium according to the invention, readable by the processor 62 and on which there is recorded a computer programme conforming to the invention comprising instructions for implementation of the steps of a checking and/or monitoring method of the invention previously described with reference to FIG. 1.

This computer programme, in equivalent manner, defines functional modules of the command module 59 able to implement the steps of the checking method 10.

A description is now given of a method 110 for checking the compliance of a workpiece according to a second embodiment with reference to FIGS. 2 to 4D.

In this second embodiment, workpiece k has p characteristics $X^1, \ldots, X^p$ where p is an integer of at least 2. In the remainder hereof, the denotations having the letter k in subscript relate to workpiece k of which the compliance is verified during the checking method 110, and the denotations having a number i in superscript relate to the i-th of the p characteristics $X^1, \ldots, X^p$ of workpiece k of which the compliance is verified during the checking method 110.

In one example, the p characteristics $X^1, \ldots, X^p$ are each dimensional values measured on workpiece k.

FIG. 2 schematically illustrates the steps of the checking method 110.

In FIG. 2, steps similar to those in the first embodiment carry the same reference as in FIG. 1, with the exception that this reference number is increased by 100.

Checking method 110 therefore comprises a step 112 to provide workpiece k, an estimation step 114, a verification step 116, a checking step 122, a step 118 at which the workpiece k is declared compliant for characteristic $X^i$, a step 119 at which workpiece k is declared non-compliant for characteristic $X^i$, and an incrementation step 132.

These steps are similar to those of the first embodiment, with the exception that they are performed for each of characteristics $X^1, \ldots, X^p$ and not for a single characteristic X.

In practice, it is possible that characteristics $X^1, \ldots, X^p$ depend on the same measuring operations that can be performed on workpiece k. For example, when the p characteristics $X^1, \ldots, X^p$ are each dimensional values measured on workpiece k, these dimensional values may depend on measurement of the same geometric elements as on workpiece k, in particular when p is high.

To take this situation into account, pre-processing steps are carried out before performing measurements on workpiece k. These steps are detailed in the block diagram in FIG. 3.

When the decision criterion is not satisfied for at least one of the p characteristics (step 116, FIG. 2), method 110 (marker R1, FIGS. 2 and 3) moves onto step 117A at which the list of characteristics $X^1, \ldots, X^p$ is defined for which the decision criterion is not satisfied.

Method 110 then moves onto step 117B at which a list is defined of the measuring operations to be performed on workpiece k. This list of measuring operations is based on the list made at step 117A and on a dependency tree D associating each of the p characteristics $X^1, \ldots, X^p$ with at least one measuring operation $M^1, \ldots, M^n$ that can be performed on workpiece k. The dependency tree D is previously determined when specifying the characteristics $X^1, \ldots, X^p$ to be checked, and can therefore be stored in memory. It will be noted that n is not necessarily equal to p.

Method 110 next moves onto step 117C at which a list of additional characteristics of workpiece k is defined. This list of additional characteristics comprises at least some and preferably all the characteristics able to be measured when performing the measuring operations in the list defined at step 117B, independently of the fact that these additional characteristics may have satisfied the decision criterion.

Method 110 next passes onto the measuring step 120A at which a value is measured of each of the characteristics in the lists defined at step 117A and at step 117C.

Once the measuring step 120A completed, method 120 (markers R2 and R3 in FIGS. 2 and 3) moves onto the checking 122 and updating steps 124 for each of the characteristics measured at step 120A.

In this manner, method 110 benefits from the data provided by measurements of the additional characteristics, even if the decision criterion has indicated measurement thereof is not necessary. Method 110 therefore draws maximum benefit from the results of measurements for which performance was indicated by the decision criterion. This is particularly advantageous since a measuring operation such as measurement of a geometric element on workpiece k, is costly in time. In addition, method 110 takes into account a greater amount of information provided by the measuring operations, which contributes towards making it even more robust.

To facilitate comprehension of the foregoing, an illustration is given with a practical example illustrated in FIGS. 4A to 4D.

In FIG. 4A, as a very simplified example, a workpiece 2 is illustrated composed of a disk having eight drill holes 2-0, 2-1, 2-2, 2-3, 2-4, 2-5, 2-6, 2-7. FIG. 4A also illustrates an example of geometric dimensioning of the workpiece 2 according to standards ISO 8015 and ISO 1101.

Figure 4B:
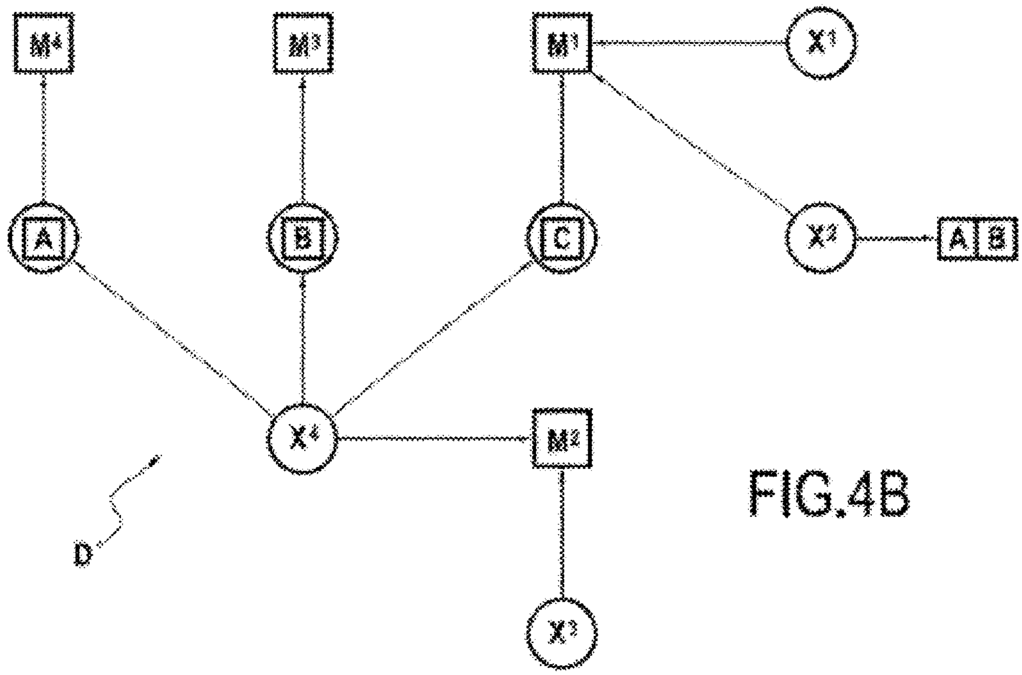

FIG. 4B illustrates an example of a dependency tree D. In this example, it is only focused on verifying the geometric dimension of drill holes 2-0 and 2-1, on the understanding that this example can easily be generalised to verification of the geometric dimensions of drill holes 2-0 to 2-7, and thereafter to the geometric dimensioning of a more complex part. In this example, since it is sought to check the geometric dimensions of drill holes 2-0 and 2-1, four characteristics $X^1$, $X^2$, $X^3$ and $X^4$ were defined in Table 1 below.

TABLE 1

| Reference of characteristic | Meaning of characteristic |
|---|---|
| $X^1$ | 2-0 drill diameter |
| $X^2$ | 2-0 drill position |
| $X^3$ | 2-1 drill diameter |
| $X^4$ | 2-1 drill position |

As will be understood with reference to FIGS. 4A and 4B, these characteristics $X^1$, $X^2$, $X^3$ and $X^4$ depend on the reference plane A, reference cylinder B and reference plane C. It follows that characteristics $X^1$, $X^2$, $X^3$ and $X^4$ can be checked with four measuring operations $M^1$, $M^2$, $M^3$ and $M^4$ which are defined in Table 2 below.

TABLE 2

| Reference of measuring operation | Meaning of measuring operation |
|---|---|
| $M^1$ | Measurement of drill hole 2-0 |
| $M^2$ | Measurement of drill hole 2-1 |
| $M^3$ | Measurement of cylinder B |
| $M^4$ | Measurement of plane A |

As mentioned above, the dependency tree D is previously determined when specifying characteristics $X^1$, $X^2$, $X^3$ and $X^4$.

Figure 4C:
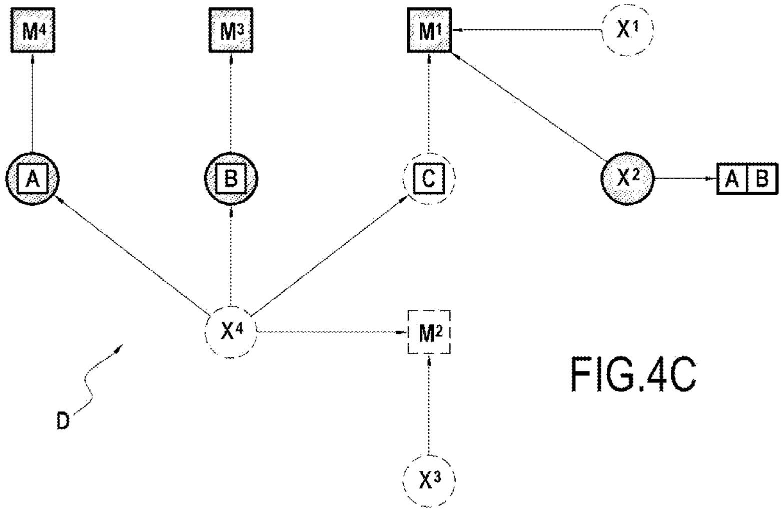
Figure 4D:
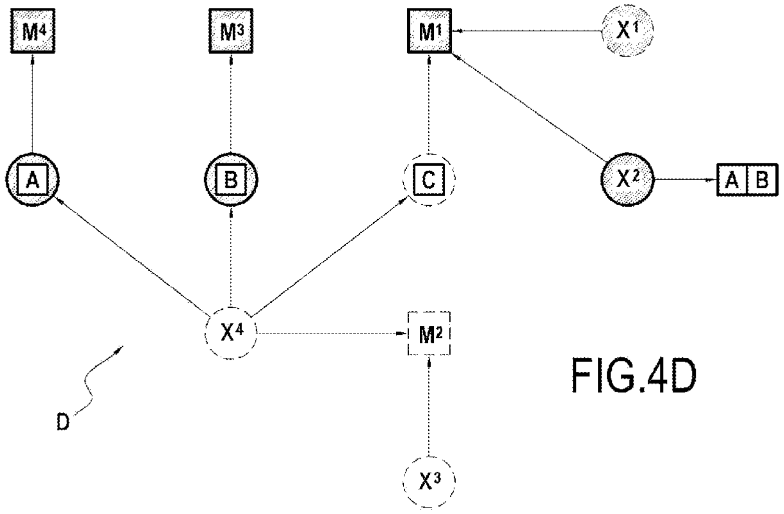

FIGS. 4C and 4D are similar schematics to FIG. 4B visually illustrating an example of application of the dependency tree D.

In these Figures, it is assumed that the different decision criteria indicate that it is necessary only to measure a value of characteristic $X^2$ (position of drill hole 2-0) («No» at step 116 for characteristic $X^2$), and that it is not necessary to measure a value of characteristics $X^1$, $X^3$ and $X^4$ («Yes» at step 116 for characteristics $X^1$, $X^3$ and $X^4$). The list of characteristics defined at step 117A therefore only contains characteristic $X^2$. This characteristic is shaded in FIGS. 4C and 4D, the others being surrounded by dotted lines in FIG. 4C.

With the aid of the dependency tree D, it will easily be understood that characteristic $X^2$ is associated with measuring operations $M^1$, $M^3$ and $M^4$. Therefore, the list of measuring operations defined at step 117B contains the measuring operations $M^1$, $M^3$ and $M^4$. These are shaded in FIGS. 4C and 4D, measuring operation $M^2$ being surrounded by a dotted line in FIGS. 4C and 4D.

It will now be easily understood—since the list of measuring operations defined at step 117B comprises measuring operation $M^1$ which consists of measuring drill hole 2-0—that this measuring operation $M^1$ also allows information to be obtained on the diameter of drill hole 2-0, i.e. on characteristic $X^1$. As a result, in this example, the list of additional characteristics defined at step 117C contains characteristic $X^1$, independently of the fact that the decision criterion has been verified for characteristic $X^1$. This is illustrated by shading and dotted lines in FIG. 4D.

Thereafter, at measuring step 120A, by performing measuring operations $M^1$, $M^3$ and $M^4$, a value of characteristics $X^1$ and $X^2$ is measured. The following steps of method 110 are then carried out as already explained above.

In the first and second embodiments, the compliance of the workpieces is checked in the order in which they are provided, which amounts to incrementing k by +1 at incrementation steps 32 and 132. However, in practice, it is possible that the workpieces are checked in an order differing from the order in which they are provided, in particular on account of the physical organisation of the checking station intended to carry out checking of compliance. A description is now given therefore of embodiments able to take this possibility into account.

FIGS. 5A to 5C illustrate a third embodiment of the compliance checking method.

In FIG. 5A, steps similar to those in the first embodiment are indicated by the same reference number as in FIG. 1, with the exception that this reference number is increased by 200.

Checking method 210 therefore comprises step 212 to provide workpiece k, an estimation step 214, a verification step 216, a measuring step 220, a checking step 222, an updating step 224, a step 218 at which workpiece k is declared compliant for characteristic X, and a step 219 at which workpiece k is declared non-compliant for characteristic X.

As previously mentioned, in method 210 the compliance of workpieces is checked in an order differing from the order in which they are provided. Therefore, at incrementation step 232A, k is not incremented by +1, but by a nonzero integer b which can be positive or negative.

FIG. 5B provides a practical example in which the workpieces are checked in an order differing from the order in which they are provided. In FIG. 5B, a compliance checking sequence 900 is schematised by the checking chain C1 to C7, and the rank of the workpiece verified at each check is indicated by a number on each of checks C1 to C7. Therefore, at check C1, workpiece n°1 is checked; at check C2, workpiece n°2 is checked; at check C3, workpiece n°5 is checked; and so on. Returning to the incrementation step 232A in FIG. 5A, when it is arrived at check C3 for example, k is incremented by b=+3 (since, from workpiece n°2, it is moved onto workpiece n°5); when it is arrived at check C5, k is incremented by b=−3 (since, from workpiece n°6, it is moved onto workpiece n°3).

The compliance checking sequence 900 is memorized as and when the checking method 210 and monitoring method 210P proceed, in a database DB. The database DB can also store the results of the measurements performed at steps 213M and 220.

After the provision step 212 of workpiece k, method 210 moves onto step 213A at which the compliance checking sequence 900 is read in the database DB.

After step 213A, method 210 moves onto step 213B at which workpiece k being checked is checked in contrary order to the order in which the workpieces are provided. By «checked in contrary order», it is meant that workpiece k being checked is of lower rank than the workpiece by which it is preceded. This equivalently amounts to step 213B determining whether or not b>1.

If condition «b>1» is untrue («No» at step 213B), then workpiece k being checked is of lower rank than the workpiece by which it is preceded in the checking sequence 900. Still taking the checking sequence 900 in FIG. 5B as example, at check C5, b=−3, and workpiece n°3 is checked in contrary order since workpiece n°6 was previously checked at check C4. In this case, method 210 moves onto step 213M at which the values are measured of all the characteristics of workpiece k, independently of the estimated risk of non-compliance for these characteristics. At other steps not illustrated in the Figures, it is determined and declared on the basis of the values thus measured at step 213M whether or not workpiece k is compliant, in similar manner to steps 222, 218 and 219. In addition, at step 224M, the law of probability $\mathcal{L}_k$ is updated only by applying drift which solely follows a Brownian motion, to obtain an updated law of probability $\mathcal{L}_{k+1}$.

If condition «b>1» is true («Yes» at step 213B), the workpiece k being checked is of higher rank than the workpiece by which it is preceded in the checking sequence 900. Still taking the checking sequence 90 in FIG. 5B as example, at check C3, b=+3, since workpiece n°2 was previously checked at check C2. In this case, method 210 moves onto step 213C at which, on the basis of database DB, a list of all the workpieces of rank j is defined, such that j<k and the workpiece of rank j has not yet been subjected to a checking operation.

After step 213C, method 210 moves onto step 214 to estimate the risk of non-compliance $TNC_k$ of workpiece k being checked.

After step 214, method 210 moves onto verification step 216 of the decision criterion.

The decision criterion comprises the first criterion described above in connection with the first embodiment. This first criterion will not be described again in detail.

The decision criterion further comprises a second criterion similar to the one described above in connection with the first embodiment, but modified to take into account the fact that workpiece k being checked is of a higher rank than the workpiece by which it is preceded in the checking sequence 900.

More specifically, the second criterion verifies that $VNC_k' < V_{k',\alpha}$, where $$VNC'_k = \sum_{j=1}^{k} a_j TNC_j,\ V_{k,\alpha} = m' \times k \times \alpha,\ k'$$

is the number of workpieces already checked with the monitoring method 210P and in the calculation of $VNC_k'$, and summing on the j workpieces is made only on the workpieces already checked in the monitoring method 210P. k' and the list of workpieces already checked in the monitoring method 210P are obtained with reference to the database DB.

After step 216, method 210 moves onto the following steps which are the same as those in the first embodiment and will therefore not be described again in detail.

FIG. 5C is a schematic similar to the one in FIG. 5B and is based on the same checking sequence 900 as in FIG. 5B, with the exception that checks C1 to C7 are not illustrated in the order of checks C1 to C7 but in the order of rank of the checked workpieces.

As illustrated in this FIG. 5C, at the time of check C3 on workpiece n°5, the information on workpieces n°3 and n°4 is not yet available. At step 216, at the time of check C3 on workpiece n°5, the decision criterion is therefore determined assuming that the decision criterion was verified for workpieces n°3 and n°4, as indicated by marker 910' in FIG. 5C.

Also, since workpieces n°3 and n°4 are checked in contrary order, the values of all the characteristics of these workpieces are measured, independently of the estimated risk of non-compliance for these characteristics, as indicated by marker 910 in FIG. 5C.

It will be noted that in the third embodiment, the information supplied by the measurements performed on workpieces n°3 and n°4 at checks C5 and C6 is not taken into account at check 7 and following checks.

FIGS. 6A to 6C illustrate a fourth embodiment of the compliance checking method. This fourth embodiment, contrary to the third embodiment, allows the taking into account of information supplied by the measurements performed on workpieces checked in contrary order.

In FIG. 6A, the steps similar to those of the third embodiment are indicated by the same reference number as in FIG. 5A, with the exception that the reference number is increased by 100.

Checking method 310 therefore comprises a step 312 to provide workpiece k, an estimation step 314, a verification step 316, a measuring step 320, a checking step 322, an updating step 324, step 318 at which workpiece k is declared compliant for characteristic X, and step 319 at which workpiece k is declared non-compliant for characteristic X.

Checking method 310 also comprises steps 313A, 313B, 313C, 313M and 324M similar to steps 213A, 213B 213C, 213M and 224M of checking method 210. These steps are therefore not described again in detail. However, after step 313M, the results of the measurements performed at step 313M are recorded in a measurement database DBMV in which there are recorded all the previously measured values of characteristic X. The measurement database DBMV is typically included in the database DB.

However, checking method 310 differs from checking method 210 in that if condition «b>1» is untrue («No» at step 313B), then method 310 moves onto step 313M.

Also, if condition «b>1» is true («Yes» at step 313B), then method 310 moves onto step 313C, which is followed by step 313D.

At step 313D, the method reads the measurement database DBMV, and updates the law of probability $\mathcal{L}_k$ associated with characteristic X on the basis of the measured values entered into the measurement database DBMV.

After step 313D, method 310 moves onto step 314 to estimate the risk of non-compliance $TNC_k$ of workpiece k being checked. After step 314, method 310 moves onto step 316 to verify the decision criterion. Step 316 is the same as step 216 and is therefore not described again in detail.

After step 316, method 310 moves onto the following steps which are the same as those of the third embodiment and are therefore not described in detail again, with the exception however that when a value of characteristic X is measured at measuring step 320, method 310 also comprises a step 340 at which the measured value is added to the measurement database DBMV.

FIG. 6B reproduces the same checking sequence 900 as in FIG. 5B, and FIG. 6C is a similar schematic to the one in FIG. 6B and is based on the checking sequence 900 as in FIG. 6B with the exception that checks C1 to C7 are not illustrated in the order or checks C1 to C7 but in the order of rank of the checked workpieces.

As illustrated in this FIG. 6C and as in the third embodiment, at check C3 on workpiece n°5, the information on workpieces n°3 and n°4 is not yet available. At step 316 at the time of check C3 on workpiece n°5, the decision criterion is therefore determined assuming that the decision criterion has been verified for workpieces n°3 and n°4, as indicated by marker 910' in FIG. 6C.

Also, since the values possibly measured at checks C3 and C4 on workpieces n°5 and n°6 and at checks C5 and C6 on workpieces n°3 and n°4 are memorised in the measurement database DBMV, at check C7 on workpiece n°7 these values are read in the database DBMV, as indicated by marker 910" in FIG. 6C. This makes it possible to update the law of probability associated with characteristic X before estimating the risk of non-compliance of workpiece n°7. Since this estimation is based on a greater number of measurement data points, it is more reliable. It follows from the foregoing that method 310 is even more robust against drifts in production.

Although not illustrated in FIGS. 5A and 6A, the checking methods 210 and 310 and corresponding monitoring methods 210P and 310P can evidently be generalised to the case in which not only one characteristic X is checked but p characteristics $X^1, \ldots, X^p$ of workpiece k as in the second embodiment. In this case, checking methods 210 and 310 comprise steps similar to steps 117A, 117B, 117C and 120A, the other steps being adapted as in the second embodiment.

Additionally, the checking device 59 can evidently be configured to implement the methods of the second, third and fourth embodiments, by suitably adapting the command module 54 and/or computer programme executed by this module.

Although the present invention has been described with reference to examples of specific embodiments, modifications can be made to these examples without departing from the general scope of the invention such as defined by the claims. In particular, individual characteristics of the different illustrated/mentioned embodiments can be combined in additional embodiments. The description and drawings are therefore to be construed illustratively rather than restrictively.

The invention claimed is:

1. A method for checking a compliance of a workpiece having at least one characteristic, the method comprising:

estimating a risk of non-compliance of characteristic on a basis of a law of probability associated with the characteristic; and verifying whether the estimated risk of non-compliance satisfies a decision criterion and, if so, declaring that the workpiece is compliant for characteristic, wherein the decision criterion comprise a first criterion whereby it is verified that the estimated risk of non-compliance is lower than a fixed threshold; if not, measuring a value of the characteristic, determining whether or not the workpiece is compliant based on the measured value, and updating the law of probability associated with characteristic based on the measured value; and wherein the decision criterion comprises a second criterion whereby it is verified that a value, that is a function of the estimated risk of non-compliance and of the estimated risks of non-compliance of workpieces for which the decision criterion has previously been applied, is lower than a threshold which is a function of a number of said workpieces.

2. The method according to claim 1, wherein said value is only a function of the estimated risk of non-compliance and of the estimated risks of non-compliance of workpieces for which the decision criterion has previously been satisfied.

3. The method according to claim 1, wherein the law of probability is updated using a sequential Monte Carlo method.

4. The method according to claim 1, wherein the workpiece has p characteristics, where p is an integer of at least equal to 2, and the steps of estimation of a risk of non-compliance and verification of a decision criterion are performed for each of the p characteristics.

5. The method according to claim 4 wherein, when the decision criterion is not satisfied for at least one of the p characteristics:

a list of said at least one characteristic is defined for which the decision criterion is not satisfied;

a list of measuring operations is defined on the basis of said list of said at least one characteristic for which the decision criterion is not satisfied, together with a dependency tree associating each of the p characteristics with at least one measuring operation which can be performed on the workpiece;

a list is also defined of additional characteristics of the workpiece, said list of additional characteristics comprising at least some of the characteristics able to be measured by performing the measuring operations in said list of measuring operations, on the basis of said list of measuring operations;

a value is measured of each of said at least one characteristic for which the decision criterion is not satisfied, and a value of each of the characteristics in said list of additional characteristics; and each of the laws of probability is updated associated with each of said at least one characteristic for which the decision criterion is not satisfied and each of the laws of probability associated with said additional characteristics is updated, on the basis of the values thus measured.

6. A method for monitoring a production of workpieces, comprising the following steps:

providing a plurality of workpieces of same type and each having at least one characteristic; and checking the compliance of each of said workpieces with the checking method according to claim 1.

7. The method according to claim 6, wherein the compliance of each of said workpieces is checked in an order differing from the order in which they are provided, and a value of the at least one characteristic is measured for each of the workpieces checked in contrary order to the order in which they are provided, independently of the estimated risk of non-compliance for each of said at least one characteristic.

8. The method according to claim 6, wherein the compliance of each of said workpieces is checked in an order differing from the order in which they are provided, all the measured values are placed in memory and, before estimating the risk of non-compliance of a workpiece, the law of probability associated with each of said at least one characteristic of said workpiece is updated on the basis of the measured values placed in memory.

9. A device for checking a compliance of a workpiece having at least one characteristic, comprising a measuring machine configured to measure a value of said at least one characteristic, a command module, transmission means configured to transmit measured values from the measuring machine to the command module, and to transmit instructions from the command module to the measuring machine, the command module being configured to estimate a risk of non-compliance of characteristic on a basis of a law of probability associated with characteristic, to verify whether the estimated risk of non-compliance satisfies a decision criterion, wherein the decision criterion comprise a first criterion whereby it is verified that the estimated risk of non-compliance is lower than a fixed threshold, and, if so, to declare that the workpiece is compliant for the characteristic; if not, the command module being configured to instruct the measuring machine to measure a value of the characteristic to determine whether or not the workpiece is compliant on the basis of the value thus measured, and to update the law of probability associated with characteristic on the basis of the value thus measured, wherein the decision criterion comprises a second criterion whereby it is verified that a value, that is a function of the estimated risk of non-compliance and of the estimated risks of non-compliance of workpieces for which the decision criterion has previously been applied, is lower than a threshold which is a function of a number of said workpieces.

10. A program comprising instructions for execution of the steps of the checking method according to claim 1, when said program is executed by a computer or microprocessor.

11. A program comprising instructions for execution of the steps of the monitoring method according to claim 6 when said program is executed by a computer or microprocessor.

* * * * *